Figure 5:
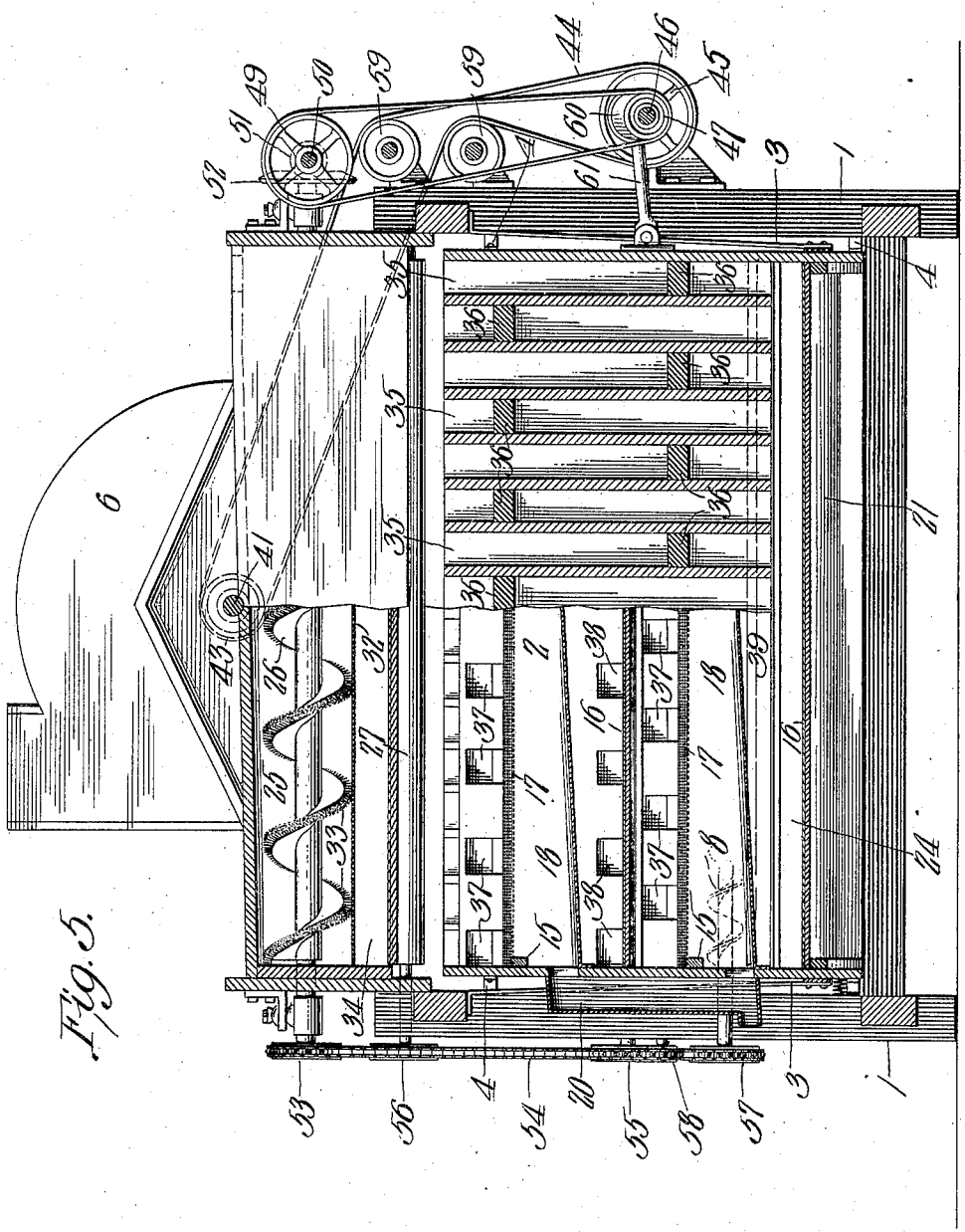

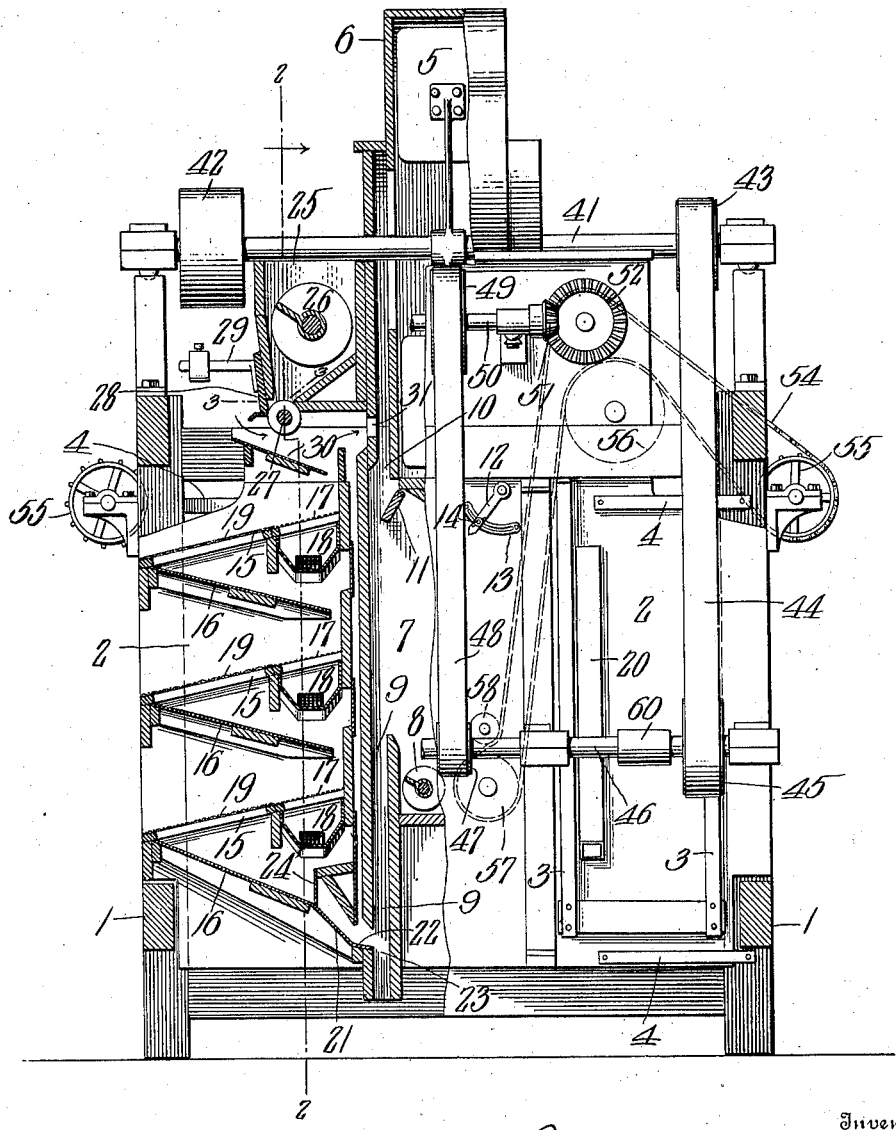

F. PRINZ.
GRAIN SEPARATOR AND CLEANER.
APPLICATION FILED SEPT. 25, 1906.
963,392.
Patented July 5, 1910.
4 SHEETS—SHEET 2.
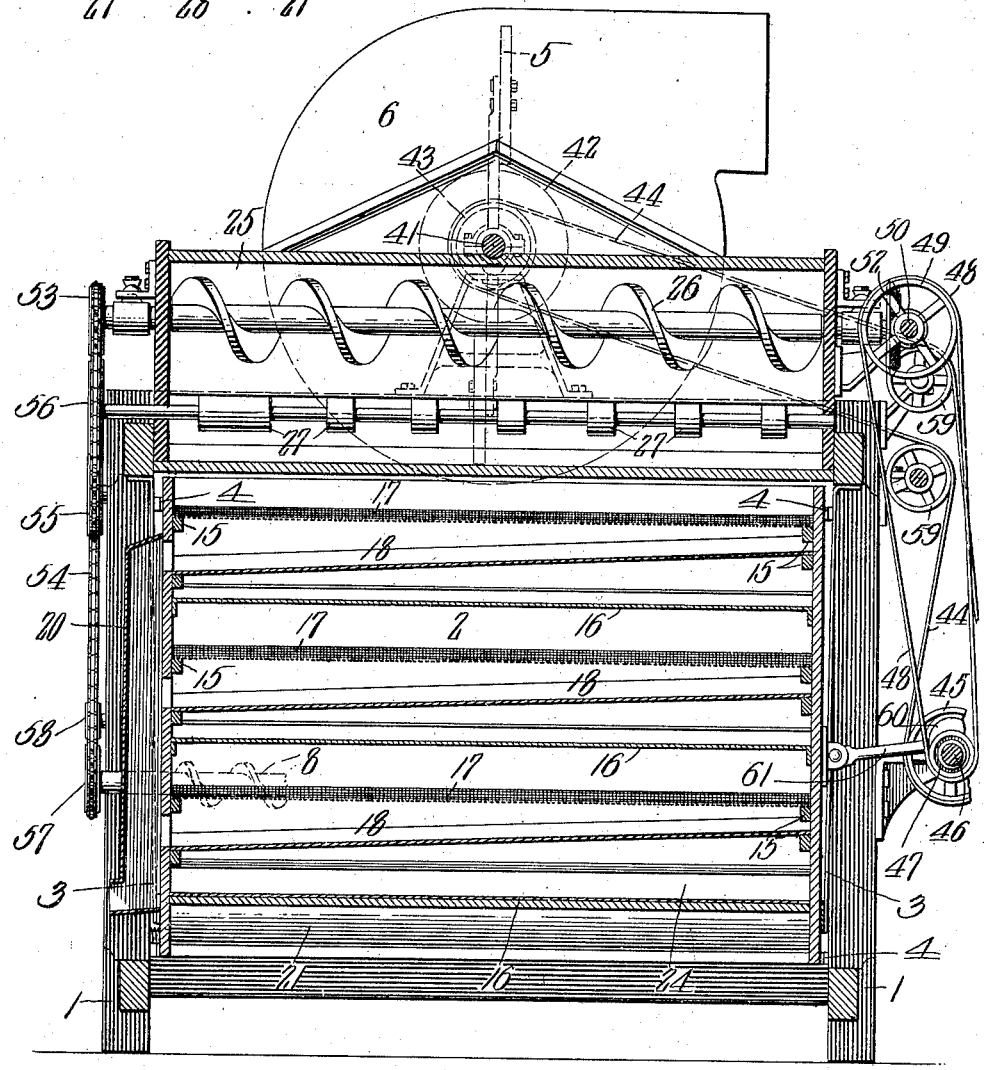

F. PRINZ.
GRAIN SEPARATOR AND CLEANER.
APPLICATION FILED SEPT. 25, 1906.
963,392.
Patented July 5, 1910.
4 SHEETS—SHEET 3.
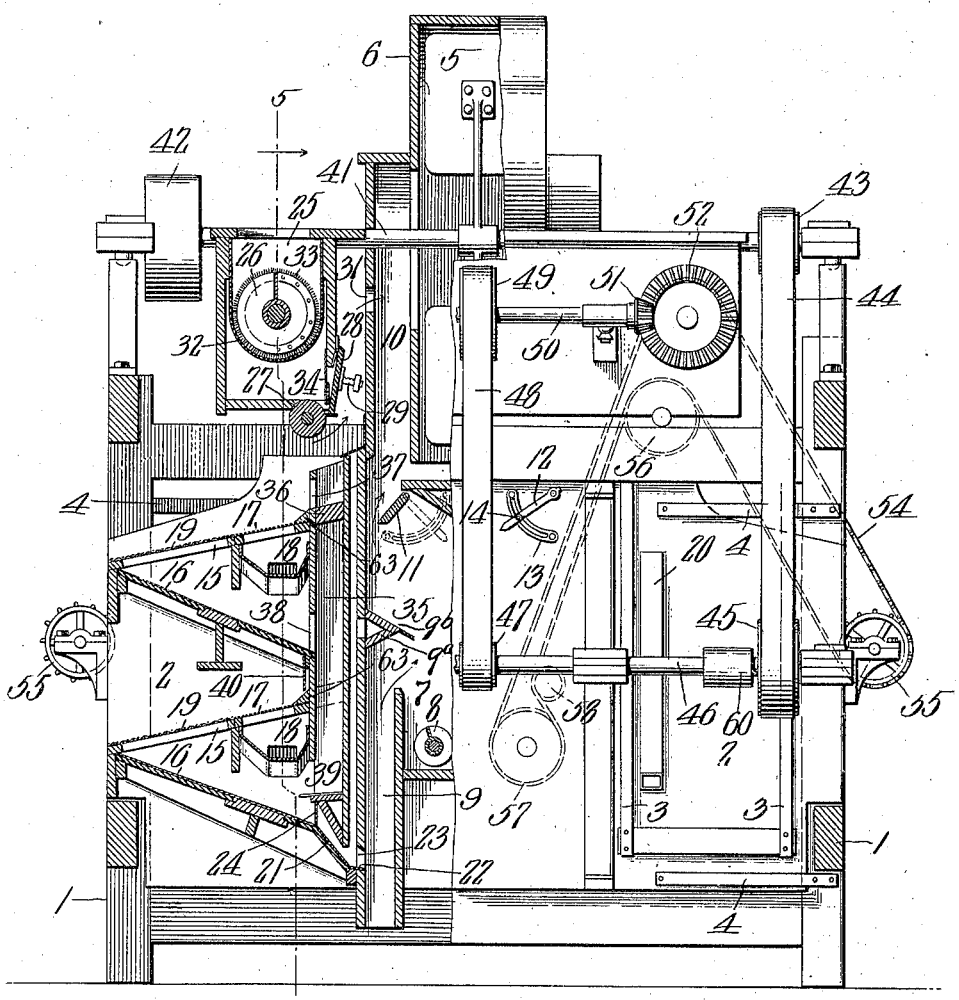

F. PRINZ.
GRAIN SEPARATOR AND CLEANER.
APPLICATION FILED SEPT. 25, 1906.

963,392.

Patented July 5, 1910.
4 SHEETS—SHEET 4.

Witnesses

Inventor

By

Attorney

UNITED STATES PATENT OFFICE.

FAUSTIN PRINZ, OF MILWAUKEE, WISCONSIN.

GRAIN SEPARATOR AND CLEANER.

963,392.  Specification of Letters Patent.  Patented July 5, 1910.

Application filed September 25, 1906. Serial No. 336,095.

*To all whom it may concern:*

Be it known that I, FAUSTIN PRINZ, a citizen of the United States, residing at Milwaukee, in the county of Milwaukee and State of Wisconsin, have invented certain new and useful Improvements in Grain Separators and Cleaners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to screens for cleaning or separating grain, more particularly to shaking screens, and has for its object, first, to combine a hopper or trough having a conveyer for distributing the grain from one end to the other of the hopper, with a feed roller and weighted gate or valve to control the flow of the grain in a thin and regular stream from the hopper throughout its length, and means for causing an air current to act upon the grain fed as described from the hopper, so that dust and light particles will be carried from the grain as it falls from the hopper on its way to a shoe or screen, thus leaving the grain in better condition for more thorough cleaning and separation without overtaxing the capacity of the screens to produce the best results.

A further object is to so direct the grain from the final vibrating directing board or plate into an air flue that the grain at the entrance into said flue will be so agitated as to bring the lighter particles to the top and thus enable the air current through the flue to act more directly upon the lighter particles and carry them off from the discharging grain.

It has further for its object to provide each sieve or screen of the shoe with a finer mesh at the receiving end than at the other portion and a trough beneath the finer screen to receive the material passing through the finer mesh at the receiving end of the screen, said troughs delivering into a discharge spout which will conduct or direct said separations to the point desired.

The invention can be embodied in different forms, some of which are illustrated, and to the accomplishment of the foregoing and such other objects as may hereinafter appear, the invention consists in the features and in the combination of parts hereinafter particularly described and then sought to be clearly defined by the claims, reference being had to the accompanying drawings forming a part hereof and in which—

Figure 1 is an end elevation of one form of the machine partly in vertical section; Fig. 2 is a vertical cross section on the line 2—2 of Fig. 1; Fig. 3 is a section on the line 3—3 of Fig. 1; Fig. 4 is an end elevation of another form of the machine, partly in vertical section; Fig. 5 is a vertical section on the line 5—5 of Fig. 4; Fig. 6 is a plan view of the sieve screens.

In the drawing, the numeral 1 designates a suitable frame containing in this instance two shaking shoes 2 suspended by spring straps 3 and braced by spring straps 4, while centrally located at the top of the frame is a fan 5, in a suitable casing 6, and beneath the casing are two settling chambers 7 each containing a conveyer 8 and in communication at its lower portion with an air trunk 9 and at its upper portion with an air trunk 10 opening into the fan casing, one trunk at each side thereof, and each provided with a controlling valve 11 adjustable by an arm 12 held at its adjustments to a quadrant 13 by a suitable thumb nut 14 or otherwise. Each shoe is provided with the desired number of sieves 15 beneath each one of which is a suitable directing board or plate 16 for directing the grain received from one sieve to the receiving end of the sieve next below, or in the case of the bottom board to the point of final delivery from the shoes. Each sieve is formed of two grades or meshes, the finer mesh 17 being at the upper end of the sieve, and through which the smaller seeds pass into trough or chute 18 beneath it, while the larger grains pass through the coarser sieve 19 and onto the directing board beneath from the lower end of which it passes onto the upper end of the next lower sieve while the tailings or material not passing through the sieve pass over the end thereof. From the second sieve, the seeds which pass through the finer mesh drop into the trough or chute beneath it while the grains passing through the coarser mesh fall onto the board or plate next below and by it are delivered onto the upper end of the next lower sieve, and so the operation proceeds through and over the several sieves and boards. The smaller seeds which pass into the troughs beneath the finer mesh of each sieve pass from said troughs into a flue 20 from which they are delivered at the point desired. It will thus be observed that there are two separations or grades on each sieve, and that the smaller seeds of each separation are taken from the upper end of the sieve and from thence carried off while the coarser grains together with such smaller grains as may pass with the same travel over and through the coarser portion of the sieve and undergo a similar grading on the next lower sieve. In this way a very effective grading of the grain is made.

The lowermost or final delivery board or plate 16 which vibrates with the shoe has its lower portion formed with a sharper incline 21 than its upper portion so as to impart to the flowing grain a greater speed over that portion than over the other portion, and at the terminal of the sharp incline is a step portion 22 approaching more nearly to a horizontal plane so that when the grain from the steeper portion strikes this step it will be somewhat checked in its movement, thus bringing the lighter particles to the top of the mass as the grain flows through the opening 23 into the air trunk 9. This sharp inclined portion constitutes a portion of the surface of the board over which the material slides as upon the upper portion only at a higher speed; and the step portion onto which it discharges is preferably relatively short as compared with the length of the sharp inclined portion. By thus bringing the lighter particles to the top at the point mentioned, the air suction in the trunk has a better opportunity to separate the lighter particles from the grain and lift them up through the trunk. The heavier grain thus separated from the lighter particles drops from the lower end of the trunk in a clean condition, while the light particles will be carried up into the fan case after the heavier of the light particles have been deposited in the settling chamber 7. A swinging valve 24 is positioned at the upper end of the sharp incline 21 so as to cut off the air from above the incline and yet permit the grain to flow from the directing board or plate onto the sharp inclined portion thereof. The sharp incline to the lower portion of the board and the step at its terminal by which the flow of the grain is somewhat checked so as to bring the lighter particles to the top and impel the grain in such condition into the air trunk is of much importance as it results in an easier and more perfect separation of the lighter particles from the grain and delivers the latter in a much cleaner condition.

As illustrated in Fig. 4 there is placed in the settling chamber 7 over the air-trunk 9 a deflector consisting of an upwardly inclined board 9$^a$ and downwardly inclined board or plate 9$^b$ the apex of which boards terminates over or adjacent to the portion of the settling chamber containing the conveyer 8. This deflector causes the air lifting material through the trunk to pass above the conveyer 8 so that the material will fall into said conveyer portion of the settling chamber; and the upper inclined portion of the conveyer will deflect over the conveyer material that may pass into the upper portion of the settling chamber. This causes the settling of a greater quantity of material in the settling chamber than would otherwise be the case, and causes it to fall directly into the part of the settling chamber containing the conveyer.

The grain is delivered to the sieves of the shoes from a hopper 25 in which is a distributing conveyer 26, the grain being fed from the hopper by a feed roll 27 against which rests a swinging gate or valve 28 provided with a weighted arm 29 by the adjustment of whose weight the flow of the grain from the hopper may be regulated. Under one construction the feed roll 27 is formed of a number of cylindrical sections spaced apart as illustrated in Figs. 1 and 2 with the front wall of the hopper extending between the sections and the weighted valve lying against the face of the sections. The distributing conveyer feeds the grain from one end to the other and the pressure of the grain at the tail end of the conveyer against the weighted valve opens the latter sufficiently to permit the grain to pass from the hopper at the points where the cylindrical sections of the feed roll are located. In the event of any unusually large grain or foreign obstruction being in the mass of grain it will pass between the roller and valve without lifting the latter beyond its normal adjustment because the stream of passing grain is of sufficient thickness to accommodate such abnormal sizes without seriously affecting the regularity of feed. The weight on the valve arm is so adjusted that the grain will not be fed from the hopper until the grain has been distributed throughout the length of the hopper whereupon the pressure at the tail end of the conveyer will overcome the weight of the valve and open the latter and keep it so as long as grain is fed to that end of the hopper. Thus it will be seen that there is a coaction between the feed roll, the weighted valve and the distributing conveyer, serving a useful purpose. It will be observed that at the tail end of the hopper one of the segments of the feed roll is longer than the others. This is made so for the purpose of having the grain accumulate upon this longer section, so as to give more pressure upon the weighted valve and thus improve its automatic action. When a sectional feed roll is used, a distributing board or plate 30 is secured to the sieve-shoe so that the grain which falls upon the board from the sections of the roll will be distributed over the surface of the board and be delivered therefrom in a continuous sheet or stream down onto the top sieve of the shoe. As the grain falls from between the feed roll and valve, and also as it travels over and drops from the distributer board, it is subjected to an air blast created by the suction fan so that dust and light particles in the grain are carried off therefrom through the opening 31 and through the air trunk 10 into the fan case, thus effecting a preliminary separation of dust and some of the lighter particles before the grain passes onto the sieves. The efficiency of this separation is materially increased by the regularity and thinness of the stream of flowing grain effected by the automatic character of the feed from the hopper before described.

In Fig. 4 the construction of the several parts is the same as in the form first described with the following exceptions. Instead of using a feed roll composed of cylindrical sections, the feed roll is continuous from end to end, and the distributing conveyer in the hopper works above a perforated or reticulated concave 32, and the flights of the conveyer have bristles or brushes 33 upon their peripheral edges to keep clear the meshes of the concave. An auxiliary flap valve 34 may be placed inside the hopper in front of the weighted automatic valve 28 so as to keep the pressure of the grain from off the weighted valve except at a point opposite to the feed roll. The concave effects a partial grading of the grain within the hopper and the grain which passes through the perforations of the concave is fed by the roll in a continuous thin sheet from one end to the other of the hopper. The sieve-shoe is formed with vertical flues 35 at the receiving end of the sieves into which the grain is delivered from the feed roll of the hopper. These flues are provided with transverse partitions or blocks 36 so located that the grain flowing into some of the flues will be delivered through openings 37 onto the top sieve, and the grain entering the other flues will be delivered through corresponding openings 37 onto the sieve next below, thus affording a direct and separate feed of the grain to each sieve instead of having it pass from one sieve to another as in the form first described. The grain which passes through the coarser mesh of each sieve onto the directing board beneath it, passes from that board through openings 38 into the flues from which it was received onto the sieve but at a point below the transverse partitions in the flues, and passes from the lower ends of such flues at the points 39 onto the lowermost or final directing board 16 where it mingles with the grain on said board from the lowermost sieve and with it passes the valve 24 and down the sharp incline and against the checking step and thence into the air trunk 9. The openings 37 onto the sieve below the top sieve may be provided with flap valves 40 which will be opened by the pressure of the grain that may accumulate in the upright flues although such valves are not absolutely essential. A preliminary separation of dust and lighter particles from the grain is effected at the point of feeding the grain from the hopper and where it passes to the upper sieve, by an air blast or current created by the suction fan which will draw the dust and lighter particles from the stream of falling grain and carry them through an opening 31 into the air trunk 10 and thence into the fan case. When the continuous feed roll is used the shaking distributing board or plate 30 is usually omitted; but such board and the construction of hopper and feed roll shown in the first form described may be used with the construction of sieve-shoe illustrated in Fig. 4 as well as with the other shoe construction illustrated and described without the exercise of invention. With the exceptions above particularly specified, the construction of the machine is substantially the same in both forms of the invention.

The fan shaft 41 carries a belt-driven pulley 42 and also a belt-pulley 43 which transmits motion through a belt 44 to a pulley 45 on a shaft 46 having a pulley 47 from which a belt or chain 48 transmits motion to a pulley 49 on a shaft 50 having bevel pinions 51 which mesh with bevel gears 52 on the ends of the shafts of the distributing conveyers 26 in the grain hoppers. The opposite ends of these shafts carry belt or sprocket wheels 53 from which belts or chains 54 pass around wheels 55 and thence to wheels 56 mounted on the ends of the feed-rolls in the hoppers and thence around wheels 57 mounted on the ends of the conveyers in the settling chambers 7, so that motion may be given to the several parts by the gearing described, or otherwise.

The numerals 58 designate belt or chain tighteners, and 59 idlers around which the belt 44 passes.

The wheels 55 may communicate motion to a shaft which will move scrapers over the screens but as the same forms no part of the present invention the same are not illustrated.

The shoes carrying the sieves are reciprocated or shaken by any suitable means, for instance, by eccentrics 60 mounted on the shaft 46 and actuating arms 61 bearing against the shoes, the return movement of the shoes being effected by springs 62 bearing against the opposite sides of the shoes, which features however are not claimed herein.

While I have illustrated a pair of shoes mounted in the frame of the machine yet it is obvious that the features of the invention may be used where only one shoe is employed.

In Fig. 4 of the drawing the sieves are illustrated as provided at their upper or receiving ends with transversely extending strips or blocks 63 formed with an inclined face which has a sharper inclination than the partitions in the upright distributing flues and sharper than the incline of the screening surface. This is for the purpose of directing the material with more impetus than otherwise onto the sieve surface, thus preventing it from banking up in the angle otherwise existing at such point and also preventing sluggishness in movement, and obtaining a better sifting and separation of the seeds from the grain in the material. On reference to Fig. 4 it will be observed that the deflector 7ª at the top of the vertical air trunk 7 has an upwardly inclined face and an opposite downwardly inclined face toward the portion of the settling chamber above the conveyer therein. This causes the air and particles carried by it to be deflected over the conveyer containing-portion of the settling chamber, and prevents the particles from being drawn directly up into the upper air trunk. It also enables the settling chamber to be of a smaller cross area than otherwise would be the case to effect the proper settling of the particles carried by the air. It is further to be observed that while the portion 19 of the sieve surface is of a coarser mesh than the portion 17 at the upper or receiving end of the sieve, the portion 19 itself is not all of the same degree of mesh but that the portion next to the finer mesh is of a coarser mesh than the lower or remaining part of the portion 19, the latter preferably gradually decreasing in size of its mesh toward the tail end thereof. This enables a quicker sifting of the material as it passes over the surface 19, a greater proportion of the larger grain passing through the upper portion of the surface 19 and a smaller proportion of the finer particles passing through as the tail end is approached. The surface of the screen therefore presents first a mesh permitting the seeds to pass through, succeeded by a larger mesh permitting the sifting through of the larger grains and diminishing mesh toward the tail end. This has been found to afford a quicker and better separation. This is of special advantage in connection with the lower inclined plate or board which directs the final product into the air flue at the end of the lowermost directing board.

It is preferred to make the portion for the passage of the seed of the form illustrated in Fig. 6, that is, with the openings substantially triangular in shape.

I have illustrated and described with particularity the preferred construction and arrangement of the several parts, but it is not to be understood that I am restricted to such details except as the same may be specifically stated in the appended claims.

Having described my invention and set forth its merits, what I claim is:—

1. In a grain separator and cleaner, a shaking shoe provided with a sieve, means for creating a forced air draft, an inclined board to receive grain through the sieve and direct it to said air blast, said board between its receiving and discharge ends being formed on different degrees of inclination, the lower portion toward the discharge end having a greater inclination than the upper portion, and means at the lower end of the board disposed at a less inclination than that of the lower portion of said board to partially check the impetus of the flowing grain so as to bring the lighter particles to the top and permit the acquired impetus to project the grain into the air trunk with the lighter particles at the top of the stream, substantially as described.

2. In a grain separator and cleaner, a shaking shoe provided with a sieve, a directing board to receive grains passing through the sieve, the discharge end of said board having a sharper incline than the other portion and a step at the end of the incline, said step portion being relatively short as compared with the sharp inclined portion of the directing board, an air trunk into which the material from the board passes, and means for creating an air draft through said trunk, substantially as described.

3. In a grain separator and cleaner, a shaking shoe provided with a sieve and a directing board beneath the sieve, the discharge end of said board having a sharper incline than the other portion and a step at the end of the incline, an air trunk into which the material from the board passes, means for creating an air draft through said trunk, and an air cut-off above the sharp incline at the upper end thereof, substantially as described.

4. In a grain separator and cleaner, a shaking shoe provided with sieves, and a hopper supplying grain thereto, said hopper having an automatically acting valve and a coacting feed roll adjacent to the lower end of said valve, and a conveyer in the hopper above the feed roll for distributing the material over the roll and accumulating it above the roll at the tail end of the conveyer to effect the opening of the valve for the feed of material from the hopper by the roll, substantially as described.

5. In a grain separator and cleaner, a shaking shoe provided with sieves, and a hopper supplying grain thereto, said hopper having a distributing conveyer, an automatically acting valve, and a feed roll adjacent to the lower end of said valve and formed of a number of cylindrical sections, substantially as described.

6. In a grain separator and cleaner, a shaking shoe provided with sieves, and a hopper supplying grain thereto, said hopper having a distributing conveyer, an automatically acting valve, and a feed roll adjacent to the lower end of said valve and formed of a number of cylindrical sections, the cylindrical section at one end of the roller being longer than the other sections, substantially as described.

7. In a grain separator and cleaner, a shaking shoe provided with sieves, a hopper supplying grain thereto, said hopper having a distributing conveyer, an automatically acting valve and a feed roll adjacent to the lower end of said valve and formed of a number of cylindrical sections, and a vibrating distributing board receiving the material from the cylindrical sections and spreading it over the board before delivery to a sieve of the shoe, substantially as described.

8. In a grain separator and cleaner, a shaking shoe provided with a sieve whose screening surface is composed at its receiving end of fine mesh for the passage of seeds, and therefrom toward the tail end of the sieve with a coarse mesh for the passage of grain, said coarser mesh increasing in degree of fineness toward the tail end of the screen, substantially as described.

9. In a grain separator and cleaner, a shaking shoe provided with sieves, an air-trunk into which material passing through a sieve is directed, a settling-chamber above said trunk and having a conveyer therein below the top of said air-trunk, a fan for creating an upward air current through said trunk and settling-chamber, and a deflector having an upwardly inclined and an opposite downwardly inclined face and located above said trunk and in position to direct air and material passing through the trunk over the portion of the settling chamber containing the conveyer, substantially as described.

In testimony whereof I affix my signature in presence of two witnesses.

FAUSTIN PRINZ.

Witnesses:
W. F. FILTER,
JOHN P. MURPHY.